United States Patent
Pitts

(10) Patent No.: US 10,951,880 B2
(45) Date of Patent: Mar. 16, 2021

(54) IMAGE CAPTURE FOR VIRTUAL REALITY DISPLAYS

(71) Applicant: GOOGLE LLC, Mountain View, CA (US)

(72) Inventor: Colvin Pitts, Snohomish, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/520,961

(22) Filed: Jul. 24, 2019

(65) Prior Publication Data
US 2019/0349573 A1 Nov. 14, 2019

Related U.S. Application Data

(60) Division of application No. 15/582,237, filed on Apr. 28, 2017, now Pat. No. 10,412,373, which is a
(Continued)

(51) Int. Cl.
*H04N 13/282* (2018.01)
*H04N 13/111* (2018.01)
(Continued)

(52) U.S. Cl.
CPC ......... *H04N 13/282* (2018.05); *G06T 15/205* (2013.01); *H04N 5/2254* (2013.01); *H04N 5/22541* (2018.08); *H04N 13/111* (2018.05); *H04N 13/117* (2018.05); *H04N 13/232* (2018.05); *H04N 13/243* (2018.05); *H04N 13/25* (2018.05); *H04N 13/275* (2018.05); *H04N 13/388* (2018.05); *G06T 2200/21* (2013.01); *H04N 5/2258* (2013.01); *H04N 13/344* (2018.05)

(58) Field of Classification Search
CPC .. H04N 13/282; H04N 13/117; H04N 13/232; H04N 13/25; H04N 13/243; H04N 13/275; H04N 13/388; H04N 13/111; H04N 5/2254; H04N 13/344; H04N 5/2258; G06T 15/205; G06T 2200/21
See application file for complete search history.

(56) References Cited

U.S. PATENT DOCUMENTS 9,769,365 B1 * 9/2017 Jannard ................ H04N 5/2254
2007/0230944 A1 * 10/2007 Georgiev ........... H04N 5/23212
                                                                        396/322
(Continued)

*Primary Examiner* — Yu Chen

(57) ABSTRACT

A light-field camera system such as a tiled camera array may be used to capture a light-field of an environment. The tiled camera array may be a tiered camera array with a first plurality of cameras and a second plurality of cameras that are arranged more densely, but have lower resolution, than those of the first plurality of cameras. The first plurality of cameras may be interspersed among the second plurality of cameras. The first and second pluralities may cooperate to capture the light-field. According to one method, a subview may be captured by each camera of the first and second pluralities. Estimated world properties of the environment may be computed for each subview. A confidence map may be generated to indicate a level of confidence in the estimated world properties for each subview. The confidence maps and subviews may be used to generate a virtual view of the environment.

16 Claims, 15 Drawing Sheets

Related U.S. Application Data continuation-in-part of application No. 15/084,326, filed on Mar. 29, 2016, now Pat. No. 10,085,005.

(60) Provisional application No. 62/333,637, filed on May 9, 2016, provisional application No. 62/148,460, filed on Apr. 16, 2015, provisional application No. 62/148,055, filed on Apr. 15, 2015.

(51) Int. Cl.
| | |
|---|---|
| *H04N 13/243* | (2018.01) |
| *H04N 13/275* | (2018.01) |
| *H04N 13/388* | (2018.01) |
| *H04N 13/117* | (2018.01) |
| *H04N 13/232* | (2018.01) |
| *H04N 13/25* | (2018.01) |
| *G06T 15/20* | (2011.01) |
| *H04N 5/225* | (2006.01) |
| *H04N 13/344* | (2018.01) |

(56) References Cited

U.S. PATENT DOCUMENTS

| | | | | |
|---|---|---|---|---|
| 2010/0141802 | A1* | 6/2010 | Knight | H04N 5/2254 |
| | | | | 348/240.3 |
| 2014/0232831 | A1* | 8/2014 | Shi | H04N 13/282 |
| | | | | 348/48 |
| 2014/0267890 | A1* | 9/2014 | Lelescu | H04N 9/045 |
| | | | | 348/373 |
| 2015/0288945 | A1* | 10/2015 | Nisenzon | H04N 13/243 |
| | | | | 348/48 |

* cited by examiner

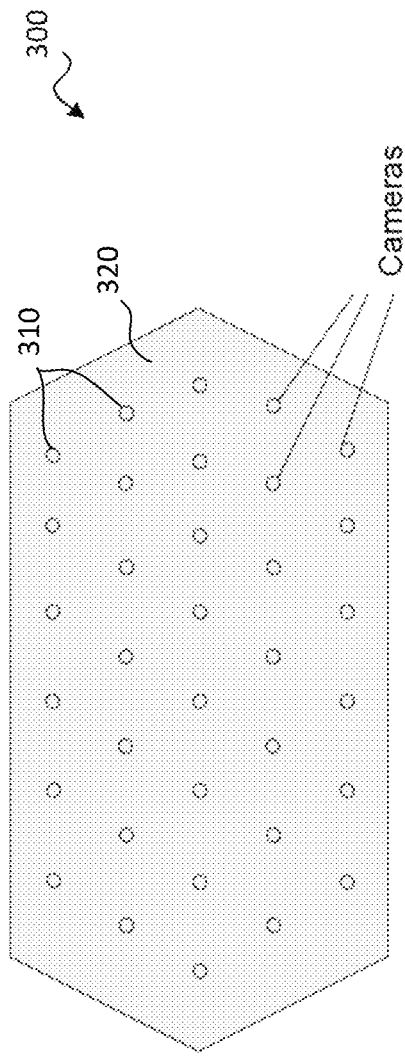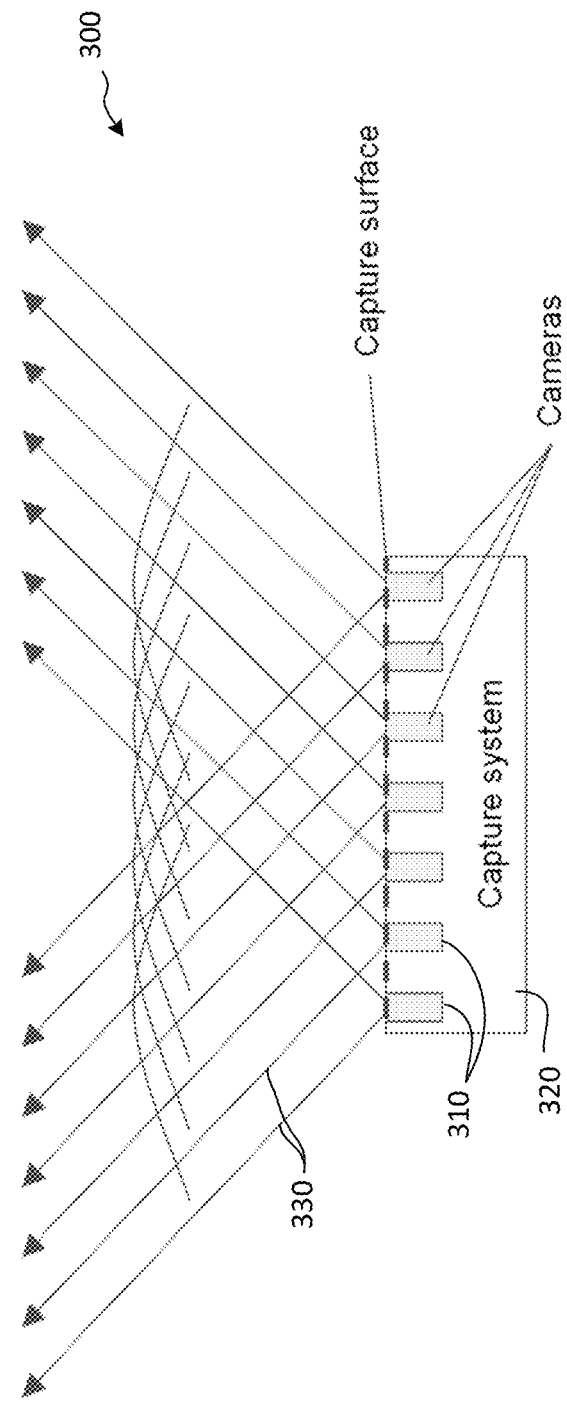

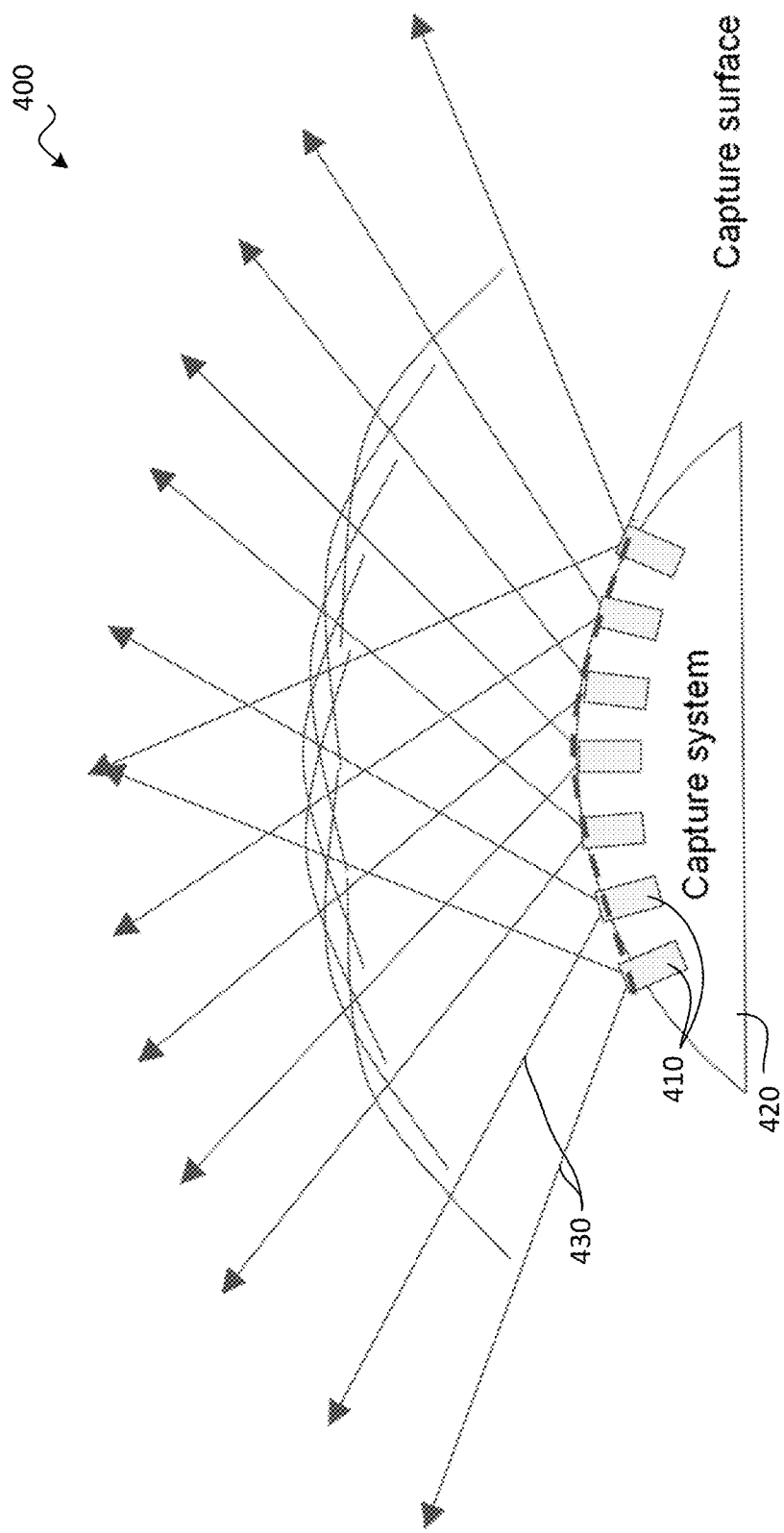

IMAGE CAPTURE FOR VIRTUAL REALITY DISPLAYS

CROSS-REFERENCE TO RELATED APPLICATIONS

The present application is a divisional application of U.S. patent application Ser. No. 15/582,237, entitled "IMPROVED IMAGE CAPTURE FOR VIRTUAL REALITY DISPLAYS" and filed on Apr. 28, 2017, the entirety of which is incorporated by reference herein.

The present application claims the benefit of U.S. Provisional Application Ser. No. 62/333,637 for "Image Capture for Virtual Reality Displays", filed May 9, 2016, the disclosure of which is incorporated herein by reference in its entirety.

The present application also claims priority as a continuation-in-part of U.S. patent application Ser. No. 15/084,326 for "Capturing Light-Field Volume Images and Video Data Using Tiled Light-Field Cameras", filed Mar. 29, 2016, the disclosure of which is incorporate herein by reference in its entirety.

U.S. patent application Ser. No. 15/084,326 claims the benefit of U.S. Provisional Application Ser. No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference in its entirety.

U.S. patent application Ser. No. 15/084,326 also claims the benefit of U.S. Provisional Application Ser. No. 62/148,460 for "Capturing Light-Field Volume Image and Video Data Using Tiled Light-Field Cameras", filed Apr. 16, 2015, the disclosure of which is incorporated herein by reference in its entirety The present application is also related to U.S. patent application Ser. No. 14/302,826 for "Depth Determination for Light-Field Images", filed Jun. 12, 2014 and issued as U.S. Pat. No. 8,988,317 on Mar. 24, 2015, the disclosure of which is incorporated herein by reference.

TECHNICAL FIELD

The present document relates to various techniques for improving image capture for virtual reality displays.

BACKGROUND

Some current volumetric capture systems (or virtual reality (VR) capture systems), such as Lytro Immerge, sparsely sample a light-field volume using a relatively large number of cameras. The cameras can be arranged, for example, over a lattice that covers a flat surface, or a 3D surface such as a sphere. The cameras may thus define a "tiled camera array." The cameras may be traditional 2D cameras, array cameras, or plenoptic light-field cameras, as described in above-referenced U.S. Provisional Application 62/148,460. Whichever system is used, it is often difficult to avoid some sparseness of the samples, leaving gaps in the coverage. Thus, in order to provide virtual reality functionality, the rendering system may advantageously interpolate between camera views.

When a viewer is watching and interacting with the captured virtual reality environment (or "volume"), it is beneficial for the playback system to allow the viewer to have as many degrees of freedom as feasible to explore the captured volume. For, example, six degrees of freedom may be provided, so as to allow the user full angular viewing freedom (yaw, pitch, roll) as well as spatial viewing freedom (translation side-to-side, up and down, and forward and backward). In general, it is desirable to provide for movement along the degrees of freedom seamlessly and smoothly.

In general, the ability of a VR capture system to deliver high quality playback at interpolated viewpoints is limited by the density of the capture viewpoints and the ability of the system to interpolate between capture viewpoints, which may in turn depend on the quality of the system's estimation of various properties of objects in the world. In order to provide accurate interpolations, it is useful to have information about properties of surfaces and objects. Estimated world properties may include, for example and without limitation, 3D geometry, reflectance, specularity of materials, transparency/translucency of objects, and/or the like. In many situations, however, it may be difficult or impossible to estimate these world properties with a sufficient degree of accuracy or precision to provide the desired results. Fine objects like hair may also be problematic.

Various techniques can be used to improve the quality of the systems with respect to artifacts caused by errors in such estimated properties. One option may be to increase the density of cameras in the capture system, and thus reduce the amount of interpolation that is required. However, increasing density can increase system requirements, costs, storage, processing, heat management, and/or the like. Furthermore, there is a physical limit to how closely cameras may be spaced in the tiled camera array.

Other techniques for improving quality include improving the accuracy of the world estimation process. While such an approach may be appealing, it can be difficult or impossible within the constraints of the system. Another option may be to include additional types of sensors designed for specific purposes. Examples include LiDAR sensors, Time-of-Flight (ToF) sensors, and structured light. Specialized sensors may help improve the accuracy of certain aspects of the world estimation process, but may still not improve the level of accuracy to the desired level.

SUMMARY

Multiple techniques are described herein to improve the overall perceptual quality of the volumetric video playback experience. The systems and methods presented herein may be applied separately or in any suitable combination with one another.

In general, the systems and methods presented herein may provide mechanisms for minimizing errors in interpolation and world property estimation, so as to provide an improved virtual environment experience.

In at least one embodiment, a mix of camera types is used in the capture system, with varying resolution, density, and/or field-of-view. This capture system employing a mix of camera types may be considered a tiered camera array. In some cases the cameras of the tiered camera array may include multiple sets of cameras, for example, with a first plurality of cameras (a "first tier") with a relatively lower density of cameras with relatively higher resolution, and a second plurality of cameras (a "second tier") with a relatively higher density of cameras with a relatively lower resolution. If desired, more than two tiers may be used. The tiers may be arranged in interleaved patterns in which voids in denser tiers are filled with cameras from less dense tiers.

In at least one embodiment, when world properties are estimated, the estimated properties also include an error metric and/or confidence value of the estimated property. For example, such an error metric may be a measure of the photometric consistency of an estimated 3D patch in the world. If all the cameras that can see a particular portion of a scene provide subviews with consistent image data and/or world properties, there may be high confidence in the accuracy of the estimate of world properties for that portion of the scene. If the image data and/or world properties differ widely between the subviews, as may be the case for many visually complex objects and for estimation errors, then the confidence value may be low. A confidence map may be generated for each subview, representing the confidence level in each of multiple regions of the subview.

When a virtual view is to be rendered, the confidence map, the world properties, and/or the subview may be used. Each region of the subview and world properties for a subview may be used in rendering the virtual view to the extent of the confidence level for that region. In some embodiments, some of the cameras may be designated as primary cameras for which the subview and/or world properties are preferentially used. For regions in which the estimated world properties for a primary camera have low confidence, the subview and/or world properties for a secondary camera may be used instead. For a tiered camera array as described previously, the higher resolution cameras may be primary cameras, while lower resolution may be secondary tertiary, etc. Thus, the virtual view may be rendered with a balance between high resolution and high confidence in the associated world properties.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIG. 3A shows an illustrative tiled camera array, as viewed from the front, according to one embodiment, with cameras are arranged in a hexagonal lattice on a planar surface.

FIG. 3B shows the tiled camera array of FIG. 3A, as viewed from above, showing the overlapping fields-of-view of the subviews captured by the cameras.

FIG. 4 shows an illustrative tiled camera array, as viewed from above, according to another embodiment, in which cameras are arranged on a convex surface, showing the overlapping fields-of-view of the subviews captured by the cameras.

DETAILED DESCRIPTION

Figure 1:
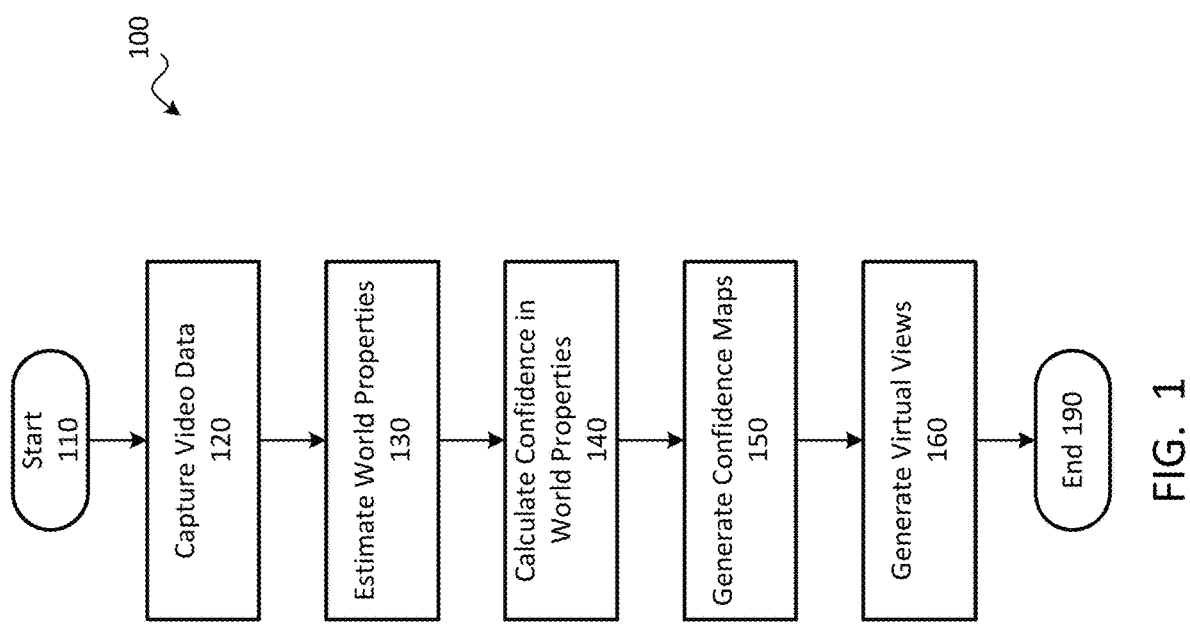
FIG. 1 is a flow diagram depicting a method, from image and/or video capture to virtual view reconstruction, according to one embodiment.

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom. In some embodiments, the viewer may move with six degrees of freedom while viewing the environment captured in the video data with virtual views rendered in real-time based on the position and orientation of the viewer's head.

Definitions

For purposes of the description provided herein, the following definitions are used:

| | |
|---|---|
| Degrees of freedom | The dimensions in which a user or viewer may explore during playback. Six degrees of freedom (or 6DOF) allow the user full angular viewing freedom (yaw, pitch, roll) as well as spatial viewing freedom (translation side-to-side, up and down, and forward and backward) |

| | |
|---|---|
| Vantage | Precomputed virtual view that may or may not be co-located with a physical camera. |
| Photometric consistency | Measure of agreement between cameras, for example, calculated by adjusting and comparing pixel windows from different cameras. Adjustments may be made taking into account the estimated world properties, such as the 3D location of a patch of the captured environment that appears in the subview under consideration. The photometric consistency may be based on agreement or consistency between versions of the patch, as viewed from different subviews. Various metrics may be used, including calculation of the average pixel error. |
| View-dependent lighting | Apparent changes in appearance of a point on an object that are dependent on the position of the observer. For example, surface reflections and refractive objects may appear very different when viewed from slightly different positions, based on the viewpoint position relative to light reflecting from or passing through the object. |
| Light-field image | The four dimensional sample representing the information carried by the ray bundles of light depicting an environment. Each ray may be indexed by a standard four-dimensional coordinate system. |
| Light-field volume | In this document, a light-field volume is the combination of all images captured into a single data set. A light-field volume may be fully or sparsely sampled. |
| Fully-sampled light-field volume | A fully sampled light-field volume includes ray data from all directions at any location within the volume. Within a fully-sampled light-field volume, virtual views may be generated from any point, facing any direction, with any field-of-view. Further, the virtual views may be generated without the need for estimated world properties (for example, 3D scene information). In general, camera arrays do not capture a fully sampled light-field volume. |
| Sparsely sampled light-field volume | A light-field volume that is not fully sampled. In general, capture systems may record image and/or video data from a number of discrete viewpoints. The data captured at these discrete viewpoints may be considered the sparse samples. Data may not be recorded between the discrete viewpoints. Virtual views may be generated from a sparsely sampled light-field volume, but may require the use of estimated world properties (for example, 3D scene information) to produce acceptable results. |
| Capture system | In this document, the term "capture system" refers to any system usable for capturing a volume for use in a virtual reality system. One example of a capture system is an array of cameras used to capture a light-field volume. A camera system is one type of capture system. A light-field camera is one type of camera system, and may be a light-field camera such as a plenoptic light-field camera or a tiled camera array (a "tiled camera array"). A tiered camera array is one type of tiled camera array. |
| Capture surface | The physical surface of the capture system that actively captures photons. The capture surface may be considered to be approximately the surface defined by the combined outward-facing surfaces of all objective lenses of the camera system. |
| Camera density | Measure of number of cameras per unit of area on the capture surface. |
| Light-field camera | A device that can capture a light-field image. |
| Capture system calibration data | Calibration data for a multiview and/or multi-camera capture system. The calibration data may include, but is not limited to, camera intrinsic calibration (focal length, un-distortion parameters, pixel size, etc.), camera extrinsic calibration (camera position and orientation relative to a reference coordinate system), and traditional camera calibration data (for example, black frame data, color conversion matrices, lens vignetting correction values, etc.) |
| Plenoptic light-field camera | A specific implementation of a light-field camera. This is a microlens-based approach where a plenoptic microlens array is inserted in-between the objective lens and the photo-sensor. |
| Plenoptic micro-lens array | A microlens array in a plenoptic camera that is used to capture the directional information. Each microlens in the array may create an image of the aperture stop of the objective lens on the surface of the sensor. |
| Disk image | A single image of the aperture stop, viewed through a plenoptic microlens, and captured by a region on the sensor surface. |

| | |
|---|---|
| Tiled camera array | A specific implementation of a light-field camera. This implementation contains an array of objective lenses with overlapping fields-of-view and one or more photosensors. Each viewpoint, with one corresponding to each lens in the objective lens array, in a tiled camera array is captured as a separate image. A tiled camera array is one type of multi-view capture system. |
| Tiered camera array (or "tiered array light-field camera") | A tiled camera array including two or more types of cameras, in which each type (or tier) may capture images and/or video of a different resolution. |
| Ray, or Ray bundle | A "Ray bundle" refers to set of light rays recorded in aggregate by a single pixel in a photosensor. The terms "ray" and "ray bundle" may be used interchangeably. |
| Patch | A small, oriented surface in 3D space within an environment captured in light-field data such as light-field video data, used for multiview photoconsistency calculations. These patches are often (but need not be) rectangular, and in some cases may correspond in size to approximately 3×3 or 5×5 pixel regions within a subview. |
| Reference camera | During some computations using multiview datasets, it may be pragmatic to perform calculations and/or comparisons in a reference frame that is consistent with the subview from a single camera. This camera may be considered the reference camera during the computation. |
| Entrance pupil | In an optical system, the entrance pupil is the optical image of the physical aperture stop, as seen through the front of the lens system. The geometric size, location, and angular acceptance of the entrance pupil may determine the camera's window of view into the world. |
| Subview | A subview is the view or image from an individual view in a light-field camera. In a plenoptic light-field camera, this is a subaperture image. In a tiled camera array, this is the image created by a single objective lens in the objective lens array. In a tiled camera array with multiple cameras with independent photosensors, a subview is the image captured the sensor of an individual photosensor. |
| Virtual view | A reconstructed view, typically for display in a virtual reality (VR) or augmented reality (AR) headset. The virtual view may be generated by resampling and/or interpolating from the light-field volume. |
| Virtual reality (VR) | An immersive viewing experience, typically delivered by a VR headset or other device. |
| Augmented reality (AR) | An immersive viewing experience that includes a combination of virtual reality elements with real-world surroundings and objects, typically delivered by an AR headset or other device. |
| Stereo virtual reality | An extended form of virtual reality in which each eye is shown a different view of the virtual world, enabling stereoscopic 3D perception. |
| Confidence | A numerical value, often in [0, 1], that may be assigned to estimated world properties. A value at or near 0 may indicate little or no confidence in the accuracy of the estimate, while a value at or near 1 indicates a high degree of confidence. |
| Influence | A numerical value, often in [0, 1], that may be assigned to pixel data and/or ray samples. The value may be used to weight the relative contributions of the pixel data and/or ray samples during image reconstruction at a virtual viewpoint. A value at or near 0 may indicate that the contribution should be very low, while a value at or near 1 may indicate that the contribution should be high. Notably, influence and confidence are often tightly coupled, where the influence may be calculated as a function of the confidence and potentially other factors. |
| Hallucination Algorithm | An algorithm that fills in voids or low-resolution areas in an image, or in light-field data, with color and/or other data based on those present in surrounding areas. |

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images and/or video are described. One skilled in the art will recognize that these various techniques and methods can be performed on images and on video (generalized herein as "video data," or in the light-field context, "light-field video data"). Further, the techniques and methods presented herein may be used in connection with a wide variety of camera types. Even though several examples utilize a tiered camera array, one of skill in the art will recognize how the described methods and techniques could be applied to a tiled camera array that is not a tiered camera array, or to a plenoptic light-field camera.

Problem Description

In order to create the highest image quality possible, particularly for VR or AR experiences with six degrees of freedom, it may be desirable to capture a fully sampled light-field volume. With a fully sampled light-field volume dataset, virtual views may be computed directly from the ray samples, and may not require additional information (for example, estimated world properties like 3D scene information). However, capturing a fully sampled light-field volume of sufficient size and resolution to generate a desirable virtual reality experience may be highly impractical or even impossible.

Figure 5:
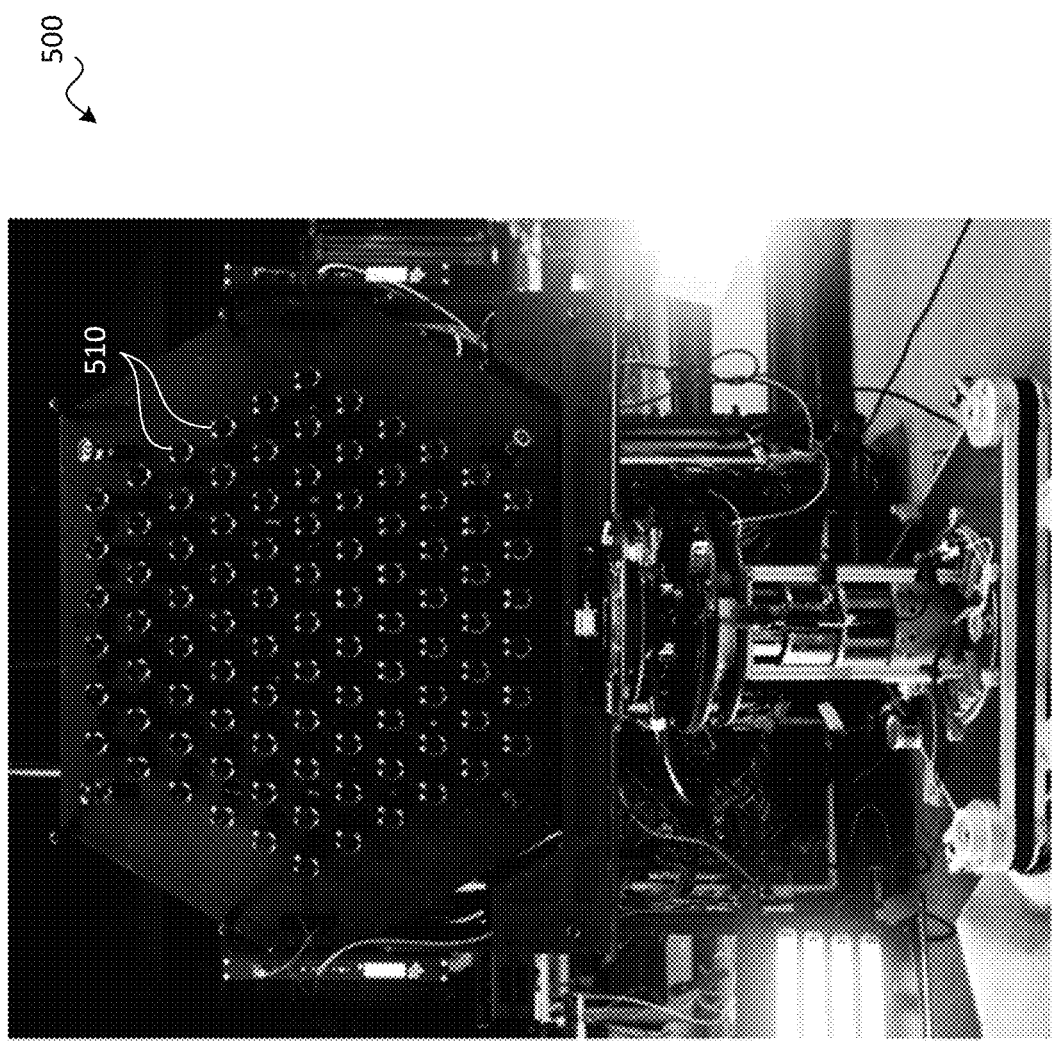
FIG. 5 is an example of an existing tiled camera array, known as the Lytro Immerge, according to one embodiment.

Due to practical considerations, existing solutions for capturing light-field volume video data are limited to capturing sparsely sampled light-field volumes. In general, existing systems employ a plurality of discrete cameras, each of which captures a subview. For example, FIG. 5 is an example of an existing tiled camera array 500, known as the Lytro Immerge, according to one embodiment. The Lytro Immerge has a large number of identical cameras 510 laid out approximately in a planar hexagonal lattice.

In order to use a sparsely sampled light-field volume to reconstruct arbitrary virtual views (for example, virtual views at locations and/or locations within the light-field volume that are determined by the location and/or orientation of the viewer's head), estimated world properties may be required. World properties may include aspects of the 3D environment captured in the light-field video, which may include but are not limited to the geometry and/or properties (such as reflectance, specularity, and/or translucency of the objects) of objects appearing in the video data.

Further, the required accuracy and/or complexity of the estimated world properties may be inversely related to the density of the cameras in the capture system. For example, reconstructing a virtual view based on a center of perspective that is one centimeter from a subview may be significantly easier and have significantly lower error than reconstructing the same virtual view from a subview that is ten centimeters away. In many cases, the projection error (measured in pixel displacement) may increase approximately linearly with the distance between the center of perspective of the virtual view and the center of perspective of the subview, given the same error in the estimated world properties.

As a result, it may be desirable to space cameras as closely as possible in the capture system, and thus reduce the amount of interpolation that is required. However, increasing density can increase system requirements, costs, storage, processing, heat management, and/or the like. Furthermore, there is a physical limit to how closely cameras may be spaced.

Overview

FIG. 1 is a flow diagram depicting a method 100 from image and/or video capture to virtual view reconstruction, according to one embodiment. The method 100 may start 110 with a step 120 in which video data is captured with a light-field camera system. In some embodiments, the video data may be captured with a tiered camera array with two or more different tiers of cameras that differ in resolution and/or density of arrangement, as will be shown and described subsequently. In alternative embodiments, a different light-field camera, such as a tiled camera array with only one camera type (i.e., a non-tiered camera array) or a plenoptic camera system may be used.

In a step 130, world properties may be estimated. The world properties may be estimated via analysis of the light-field video and/or other information, such as camera parameters and/or information about the scene from other sources. In some examples, other sensors such as LiDAR sensors may be used to provide geometry information regarding the environment captured in the video data. Such additional information may facilitate estimation of the world properties. In the alternative to or in addition to the foregoing, any techniques known in the art for estimating world properties for an environment captured in light-field or conventional video data may be used.

In a step 140, a confidence level in the estimated world properties ascertained in the step 130 may be calculated. The confidence level may represent the level of confidence that the estimated world properties are accurate. The confidence level may be expressed in many ways; according to one example, the confidence level may be numeric and may range from 0 to 1, with 0 representing low or no confidence, and 1 representing complete confidence.

In a step 150, a confidence map and/or an influence map may be generated for each of one or more of the subviews. A confidence map may be based on the world properties, as viewed from the subview, and may indicate a confidence level in the estimated world properties for objects visible in each region of the subview. A "region" may represent a ray bundle received in the photosensor of the camera system, and may have any size; in some embodiments, a region may be a single pixel; in other embodiments, each region may be 3×3 pixels square, 5×5 pixels square, or the like. In some embodiments, the confidence map may be a grayscale image, with light areas representing high confidence regions and darker areas representing low confidence regions.

In addition to or in the alternative to generation of a confidence map, an influence map may be generated in the step 150. The influence map may, for example, be a grayscale image indicative how much influence each region should have over the virtual view to be rendered. For example, lighter shades may be used for regions that are to have a high level of influence on the virtual view, while darker shades may be used for less influential regions. Like the confidence map, the influence map may be based, at least in part, on the confidence levels ascertained in the step 140.

In a step 160, one or more virtual views may be generated through the use of the subviews, the estimated world properties, and/or the confidence levels associated with each ray bundle. The estimated world properties may be used to enhance the quality of extrapolation between subviews as described above. The confidence levels may be used to further enhance the quality of virtual views generated by effectively determining which subview(s) should be used to render each region of the virtual view.

For regions of different subviews that have the same or similar confidence levels, the region with the higher resolution may preferentially be used to render the corresponding region of the virtual view. Regions with high confidence levels may be prioritized over regions with lower confidence levels for rendering the corresponding region of the virtual view.

In one embodiment, where the video data is captured with a tiered camera array, during creation of virtual views (for example, using an approach like depth image based rendering), ray data from the highest resolution cameras may preferentially be used, as long as the associated confidence and/or influence values are sufficiently high. In regions of the virtual view where insufficient information from the high resolution cameras may be available (for example, due to low confidence in the estimated world properties and/or occlusions in the originally captured data), ray bundle data from the lower resolution camera(s) may be used.

Once all desired virtual views have been rendered, the method 100 may end 190. This may represent the end of the VR or AR experience.

Figure 2:
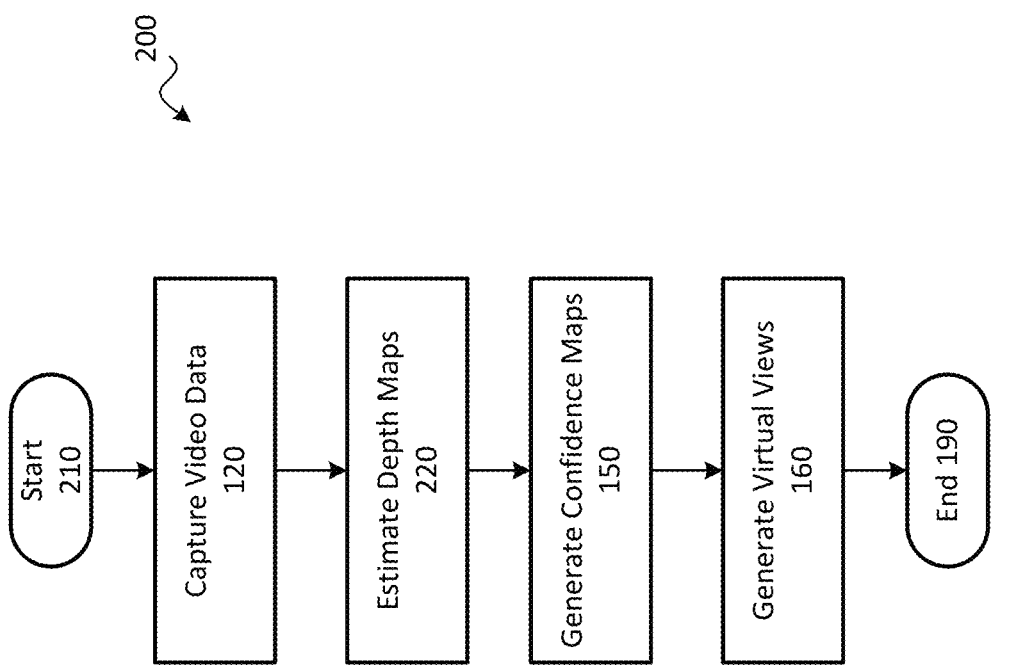
FIG. 2 is a block diagram processing flow, from image and/or video capture to virtual view reconstruction, according to another embodiment.

FIG. 2 is a block diagram processing flow, depicting a method 200 from image and/or video capture to virtual view reconstruction, according to another embodiment. The method 200 may start 210 with the step 120 in which video data is captured as in the method 100. Then, in a step 220, depth maps may be generated.

A depth map may be a grayscale image depicting the estimated depth of objects in the captured environment, from the camera that captured the corresponding subview. As in estimation of the world properties, depth maps may be generated via analysis of the video data and/or use of other data, such as known locations of objects within the environment and/or sensor data from other sensors such as LiDAR sensors.

Pursuant to the step 220, depth maps may be directly calculated for each of one or more subviews. Then, in the step 150, a confidence and/or influence map may be generated for each subview. As in the method 100, the confidence and/or influence map generated in the step 150 may be indicative of the confidence level in world properties such as the depth information contained in the depth maps estimated in the step 220. In the step 160, the virtual views may be generated using the captured image and/or video data, the estimated world properties, and the confidence/influence data associated with each captured ray bundle, as in the method 100. The method 200 may then end 190.

Tiled Camera Arrays

In some embodiments, the step 120 may be carried out with a tiled camera array. A tiled camera array is one type of light-field camera, which operates based on the use of multiple objective lenses, rather than a single objective lens with a microlens array, as in a plenoptic light-field camera.

FIGS. 3A and 3B depict an illustrative tiled camera array 300, as viewed from the front and the side, respectively, according to one embodiment. The tiled camera array 300 may have cameras 310 that are arranged in a hexagonal lattice on a planar surface 320 with overlapping fields-of-view 330.

FIG. 4 depicts an illustrative tiled camera array 400, as viewed from above, according to another embodiment, with cameras 410 arranged on a convex surface 420. The fields-of-view 430 of the cameras 410 overlap, but are oriented differently from each other to provide a more wide-angled combined field-of-view. FIG. 5 depicts the Lytro Immerge, as described above, which may be a tiled camera array of the type depicted in FIGS. 3A and 3B.

Tiered Camera Array

In some embodiments, the capture system used to carry out the step 120 is a tiled camera array that includes two or more tiers of camera types, and may thus be a tiered camera array. The cameras of each type may capture images and/or video at different resolutions. In some embodiments, the tiers may include a sparse set of cameras with high quality and resolution, and a more densely packed set of cameras with significantly lower resolution. Comparative examples will be shown and described below.

Figure 6:
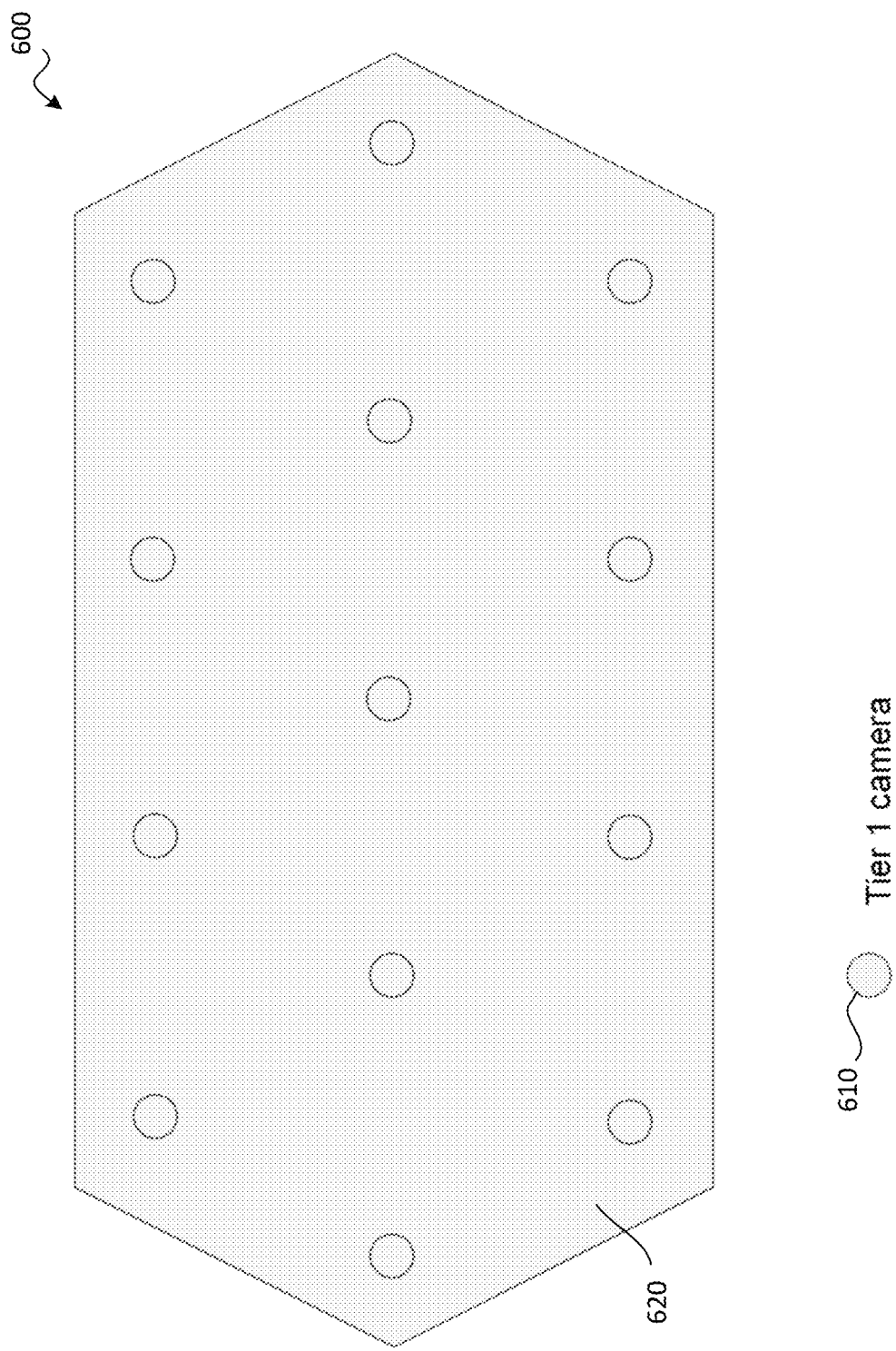
FIG. 6 is an illustrative example of a tiled camera array including a plurality of discrete cameras, according to one embodiment, in which all cameras are of the same type and have the same resolution.

FIG. 6 is an illustrative example of a tiled camera array 600 including a plurality of discrete cameras 610, according to one embodiment, in which all cameras are of the same type and have the same resolution. The tiled camera array 600 may have, for example, thirteen high resolution cameras, each of which captures images with 4000×4000 pixels, covering a capture surface 620 with an area of A m² (for example, if the spacing between cameras is 0.2 m², A is approximately 0.25 m²). Each camera may have a field-of-view equal to F degrees (for example, 90 degrees). The total resolution is 208 MP.

Figure 7:
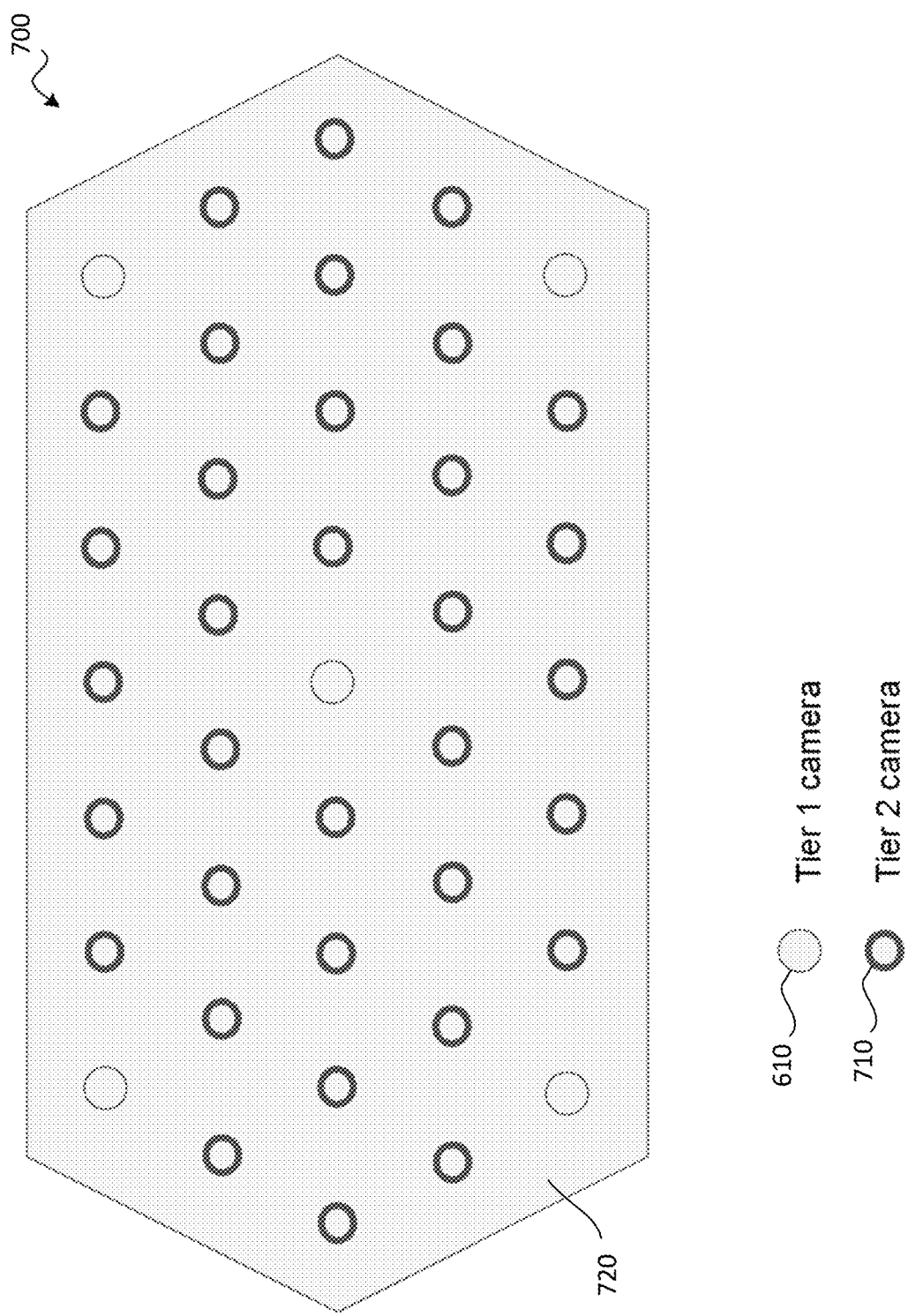
FIG. 7 is an illustrative example of a tiered camera array including two tiers of camera types, according to one embodiment.

FIG. 7 is an illustrative example of a tiered camera array 700 including two tiers of camera types, according to one embodiment. The cameras 610 of Tier 1 may have relatively higher resolution and lower density than the cameras 710 of Tier 2. As shown, the cameras 610 may be arranged in a hexagonal lattice, and the cameras 710 may also be arranged in a hexagonal lattice with voids that accommodate the cameras 610.

Specifically, the tiered camera array 700 may include five high resolution (Tier 1) cameras 610, each of which has a resolution of 4000×4000 pixels, and thirty-four lower resolution (Tier 2) cameras 710, each of which has a resolution of 1000×1000 pixels. The cameras 610 and the cameras 710 may cooperate to cover a capture surface 720 with an area of A m² (for example, the same area as covered in 600). Each of the cameras 610 and the cameras 710 may have a field-of-view equal to F degrees (for example, 90 degrees). The total resolution is 114 MP, and camera density is quadrupled relative to the configuration of FIG. 6, as depicted in FIG. 7.

Figure 8:
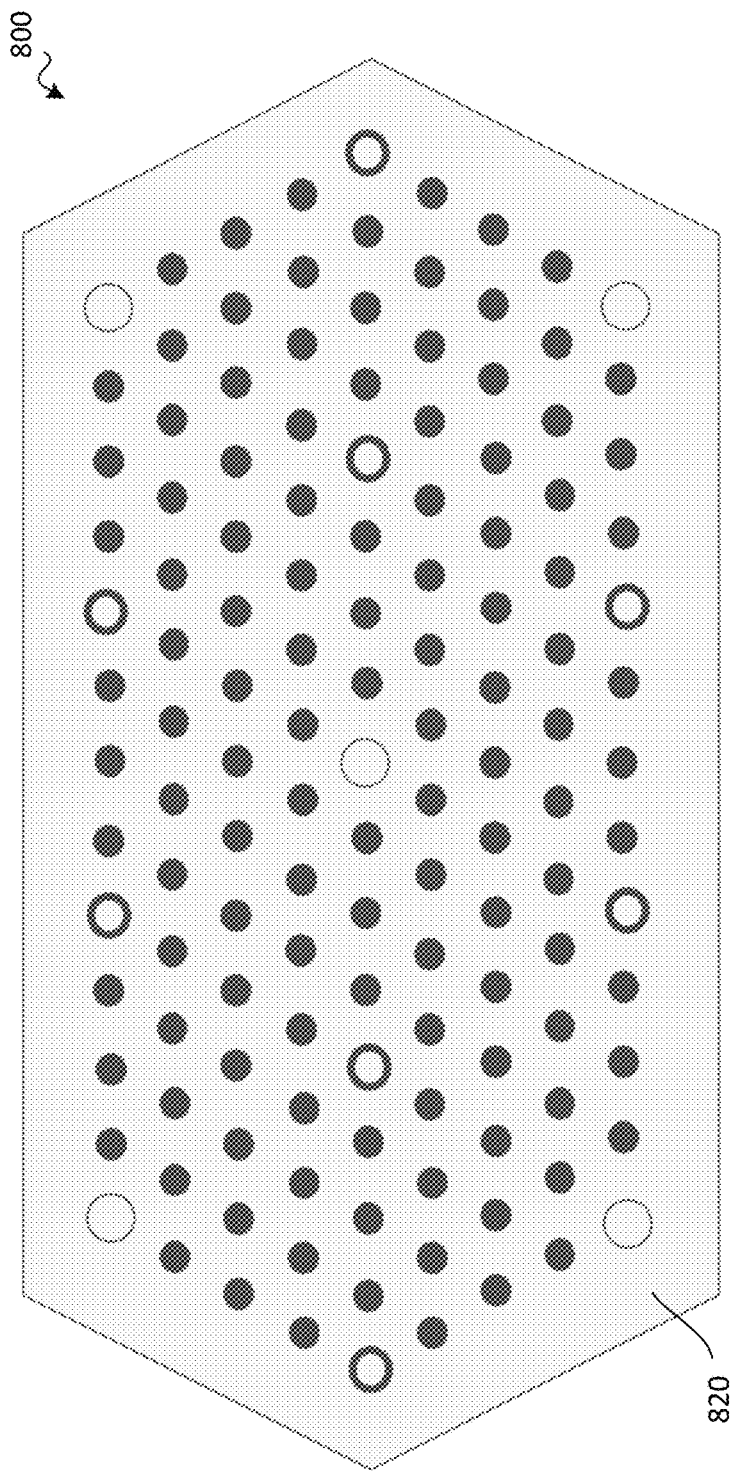
FIG. 8 is an illustrative example of a tiered camera array including three tiers of camera types, according to one embodiment.

FIG. 8 is an illustrative example of a tiered camera array 800 including three tiers of camera types, according to one embodiment. The cameras 610 of Tier 1 may have relatively higher resolution and lower density than the cameras 710 of Tier 2, which may have relatively higher resolution and lower density than the cameras 810 of Tier 3. As shown, the cameras 610 may be arranged in a hexagonal lattice, and the cameras 710 may also be arranged in a hexagonal lattice with voids that accommodate the cameras 610. The cameras 810 may be arranged in a hexagonal lattice with voids that accommodate the cameras 710 and the cameras 610.

Specifically, the tiered camera array 800 may have five high-resolution cameras 610 (Tier 1), each of which has a resolution of 4000×4000 pixels, ten lower resolution cameras 710 (Tier 2), each of which has a resolution of 1000×1000 pixels, and 118 very low resolution cameras 810 (Tier 3), each of which has a resolution of 500×500 pixels. The cameras 610, the cameras 710, and the cameras 810 may cooperate to cover a capture surface 820 with an area of A meters sq. Each of the cameras 610, the cameras 710, and the cameras 810 may have a field-of-view equal to F degrees. The total resolution is 119.5 MP, and camera density is raised by a factor of 16 relative to the configuration of FIG. 6, as depicted in FIG. 8.

In the exemplary tiered camera arrays 700 and 800 shown in FIGS. 7 and 8, respectively, the camera density is significantly higher while the aggregate pixel count is significantly lower when compared to the tiled camera array 600 shown in FIG. 6. Thus, the tiered camera arrays 700 and 800 may serve to reduce computation, storage, and data transmission requirements while enhancing the accuracy of interpolations needed to render virtual views. The presence of the high-resolution cameras 610 may enable the virtual views to also have high resolution, at least in regions where confidence in the world properties is relatively high.

Notably, the term "resolution" in cameras may often be used to describe the pixel count of the captured images. When comparing cameras with similar or identical fields-of-view, the pixel count may be adequate information to determine which camera may better resolve a specific object. However, in the case that the fields-of-view of the cameras are not comparable, pixel count may not be the most important factor. In this disclosure, resolution may be considered to correspond with the angular field-of-view covered by single pixel in a camera. For example, a camera that contains a field-of-view of 50° and a 100×100 pixel array may be considered to have approximately double the resolution of a camera that contains a field-of-view of 100° and the same 100×100 pixel array.

Notably, all the examples of tiered camera arrays described above contain cameras arranged in a regular pattern (for example, a hexagonal lattice). However, such an arrangement is merely illustrative, and any camera layout, including irregular patterns, may be used.

In various embodiments, other configurations can be used. By providing tiers of cameras of different resolutions, high camera densities can be achieved while potentially decreasing overall pixel counts.

Resource usage can scale differently depending on pixel count. Storage and bandwidth may generally scale linearly with pixel counts. Data processing requirements may scale according to a more complicated relationship; however, in general, more pixels increases processing time and complexity. In addition, costs for higher resolution cameras may be dramatically higher than costs for low resolution cameras. Accordingly, the techniques described herein can significantly decrease capital and/or operating costs involved in manufacturing and/or using the capture system.

Estimation of World Properties

Pursuant to the step 130 and/or the step 220, various aspects of the world may be estimated, some better than others. In at least one embodiment, the system estimates any or all of the following world properties, in any suitable combination:

- The 3D shapes and/or positions of objects appearing in the video data. Estimation of such geometric information is related to depth estimation and disparity estimation. See, for example, Furukawa et al., "Accurate, Dense and Robust Multi-View Stereopsis," IEEE Transactions on Pattern Analysis and Machine Intelligence (Volume: 32, Issue: 8, August 2010) for one method of estimating 3D properties from many camera views.
- Surface reflectance for objects appearing in the video data. See, for example, Yoon et al., "Joint Estimation of Shape and Reflectance using Multiple Images with Known Illumination Conditions", International Journal of Computer Vision, Springer Verlag, 2010, 86 (2-3), pp. 192-210.
- Semi-reflective elements (like glass windows) of objects appearing in the video data. See, for example, Xue et al., "A Computational Approach for Obstruction-Free Photography", available at https://sites.google.com/site/obstructionfreephotography/
- Other properties of objects appearing in the video data, such as translucency, index of refraction, and/or the like.
- Volumetric effects appearing in the video data, such as smoke, fire, and/or the like.
- Integration of estimated world properties from other sources. For example, such other sources may include LiDAR sensors, structured light sensors, and/or 3D models of the scene.

In some embodiments, in the step 130 and/or the step 220, depth maps are estimated for all subviews. See, for example, the Middlebury Multi-View Stereo benchmark (http://vision.middlebury.edu/mview/), a dataset and benchmark that evaluates a variety of methods and contains numerous publications and sets of sample code.

Evaluation of Confidence in World Estimates

In at least one embodiment, the system creates a world model and then, pursuant to the step 140, based on the world model, makes a determination as to a quality metric and/or confidence value of interpolations based on that world model. The quality metric and/or confidence value may later be used to decide which ray bundle data to use in rendering virtual views.

In at least one embodiment, when world properties are estimated, the estimated properties also include an error metric and/or confidence value corresponding to the estimated property. For example, such an error metric may be a measure of the photometric consistency of an estimated 3D patch in the world. If all the subviews in which the patch appears have a high degree of agreement regarding the characteristics of the patch, relative to other possibilities, there may be high confidence in the accuracy of the estimate. If the characteristics of the patch differ significantly between the subviews, as may occur with many visually complex objects and instances in which the world estimate is incorrect, then the confidence value may be low.

In at least one embodiment, the confidence value of a patch may be calculated by comparing the photometric consistency cost with the estimated properties (for example, the 3D location and orientation of the patch) against other possible positions and/or orientations. In one embodiment, the set of possible positions for a patch of pixels may be generated by sampling along the ray bundles corresponding to the pixels in the patch from the perspective of a reference camera. Each pixel in the patch contains light from a specific direction relative to the camera, which may be specified by a geometric ray equation. The patch locations may be generated by sampling at different distances along the ray from the reference camera origin. In one embodiment, a confidence score is computed that is a relative comparison of the photometric consistency cost at the estimated location relative to the lowest local cost minima of the other considered locations, as follows:

$$\text{confidence} = (\text{other\_minima} - \text{photo\_cost}) / \text{other\_minima}$$

In the case where the current cost is the lowest for the patch of the considered possibilities, the patch location may be considered to be the estimated 3D position. Confidence scores may have a value between 0 and 1, where 1 may represent high confidence. Other value scales for confidence may be used.

Figure 9:
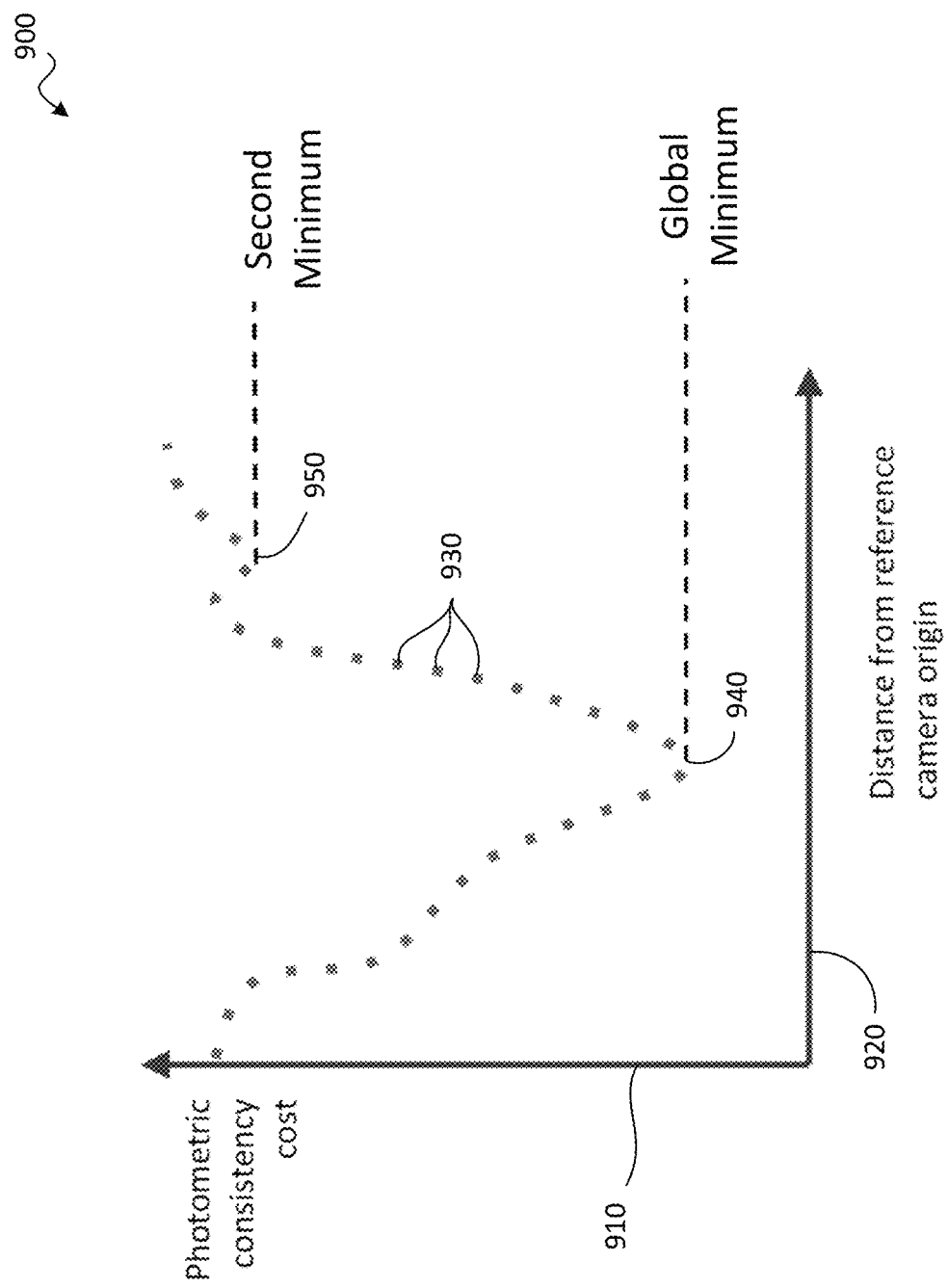
FIG. 9 is a plot depicting exemplary data for a calculated high confidence score for a patch of an environment captured in the light-field data, as viewed from a subview of the video data, according to one embodiment.

FIG. 9 is a plot 900 depicting exemplary data for a calculated high confidence score for a patch of an environment captured in the light-field data, as viewed from a subview of the video data, according to one embodiment. The plot 900 displays photometric consistency costs on the vertical axis 910 and distance on the horizontal axis 920. Each dot 930 marks the photometric consistency score for a possible distance (and hence location) of the patch. The global minimum 940 of a plurality of candidate locations is marked; this may represent the position used as an estimate of the 3D location of the patch. The second minimum 950 is also marked. When values are entered into the equation above, a confidence score near 1 may be produced.

Figure 10:
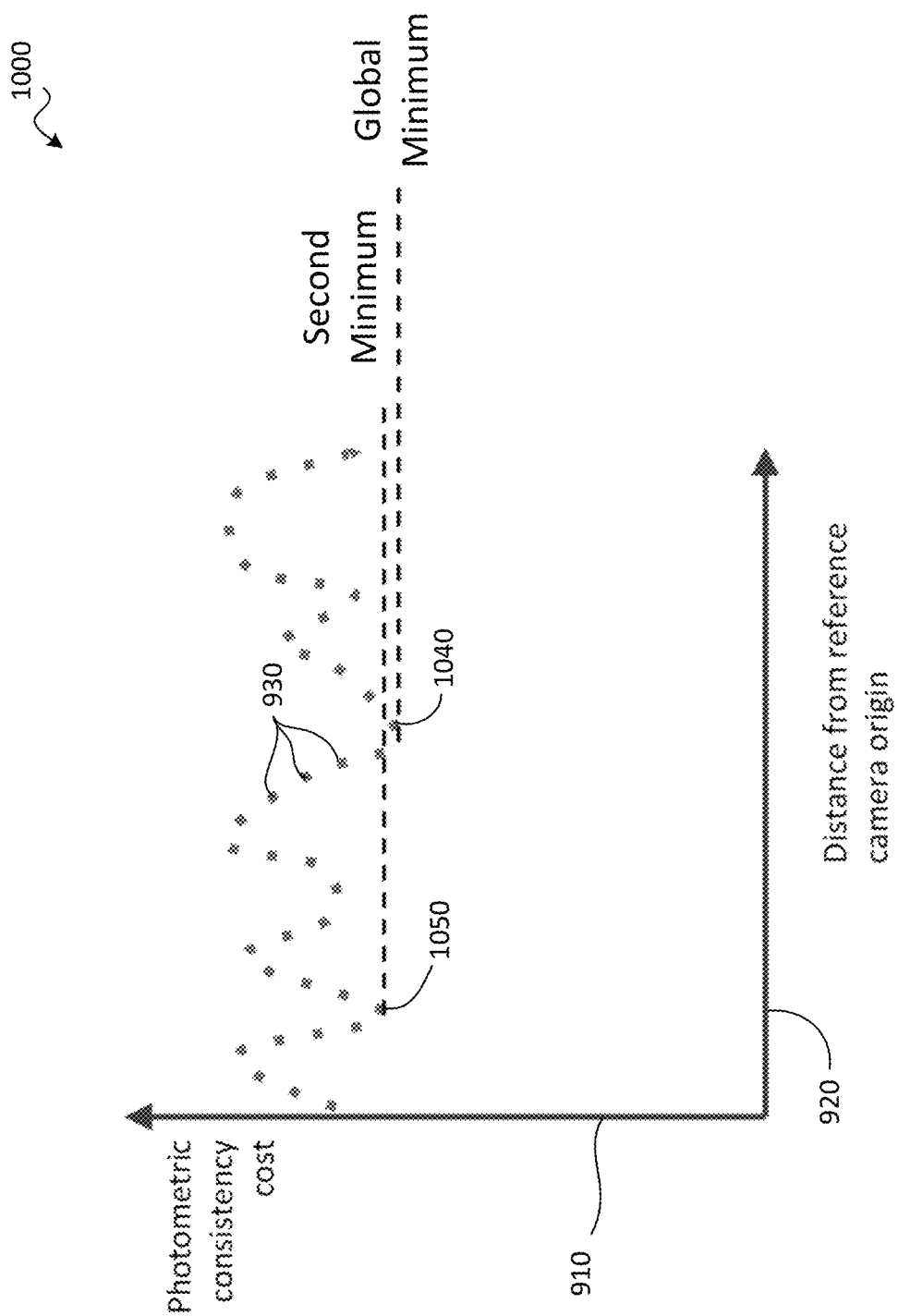
FIG. 10 is a plot depicting exemplary data for a calculated low confidence score for a patch of an environment captured in the light-field data, as viewed from a subview of the video data, according to one embodiment.

In contrast, FIG. 10 is a plot 1000 depicting exemplary data for a calculated low confidence score for a patch of an environment captured in the light-field data, as viewed from a subview of the video data, according to one embodiment. A global minimum 1040 and second minimum 1050 are marked, and the confidence score in this case would be near 0. Low confidence values may be generated when photometric consistency metrics have difficulty determining the proper location of the patch (for example, due to low contrast surfaces or view-dependent lighting).

Notably, for clarity, FIGS. 9 and 10 depict graphs in 2 dimensions, including distance and cost. In many instances, the dimensionality of the data considered in the confidence calculation may be higher (including, for example, distance, orientation, and cost), but the method may remain substantially the same.

In at least one embodiment, one measure of quality and/or confidence is photometric consistency, as described in Furukawa et al., "Accurate, Dense and Robust Multi-View Stereopsis," IEEE Transactions on Pattern Analysis and Machine Intelligence (Volume: 32, Issue: 8, August 2010). Patches having higher photometric consistency can be considered to have higher quality and/or confidence value.

In at least one embodiment, once a model has been generated, the system evaluates the quality of the model. Quality/confidence evaluation may additionally or alternatively be performed during model estimation.

In at least one embodiment, the following algorithm can be used for evaluating quality and/or confidence in a model, by projecting the color data from one subview onto another using the estimated world properties and then comparing the color values in projected virtual view to the capture subview:

Start with the image_GROUNDTRUTH from a reference camera, camera REFERENCE. This is a subview from a camera at a particular location and orientation, and is treated as "ground truth" for the following comparison.

Then, for other cameras with overlapping fields-of-view:
Perform image-based rendering, using the estimated world properties, to virtually render the data from the other camera, camera_OTHER as viewed from camera_REFERENCE
image_RENDER=render(image_OTHER, worldProperties, transform_REFERENCE_from_OTHER)
transform_REFERENCE_from_OTHER maps the pose and camera properties of one camera to another. This can be calculated, for example, as part of system calibration or determined via known methods like "bundle adjustment," and may be part of the capture system calibration data.
The "render" function may be identical or substantially identical to the render function used for interpolation in the system during playback. Any known mechanism for 3D rendering can be used to cover the basic case where world estimation is limited to 3D properties.

Compare pixels between image_GROUNDTRUTH and image_RENDER. Confidence/quality is proportional to the similarity of pixel values in areas of overlap.
Some areas may not have overlap, due to mismatched field-of-view and/or occluding objects. No confidence values are generated for those regions.
In at least one embodiment, confidence/quality is tracked back to the estimated world properties and accumulated from numerous comparisons. For example, for an estimated 3D model, each atomic unit of the model (such as a point, triangle in a mesh, or the like) can receive a confidence/quality score.

Figure 11B:
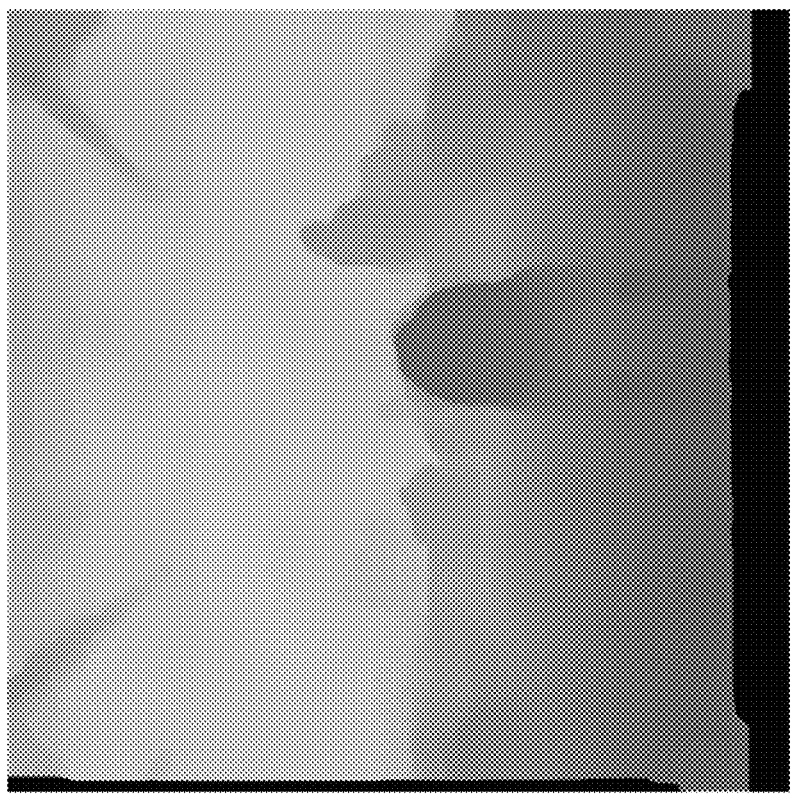
FIG. 11B is a depth map generated from the viewpoint of the camera used to capture the image in FIG. 11A, according to one embodiment.
Figure 11A:
FIG. 11A shows an exemplary subview from a camera in an array light-field capture system, according to one embodiment.

Examples are shown in FIGS. 11A to 13. FIG. 11A shows an exemplary subview 1100 from a camera in an array light-field capture system, according to one embodiment. Relative to the description above, the subview 1100 in FIG. 11A may be considered from camera_OTHER.

FIG. 11B is a depth map 1150 generated from the viewpoint of the camera used to capture the image in FIG. 11A, according to one embodiment. In the visual representation, darker colors represent nearer distances, while lighter colors represent further distances. Notably, the depth map may be considered a specific instance of estimated world properties that contains 3D positional estimates for individual ray bundles. Accordingly, FIG. 11B may be a visual representation of a depth map generated from the viewpoint of camera_OTHER.

Figure 12A:
FIG. 12A is an exemplary projection of the color image shown in camera 11A, using the depth map shown in 11B and the capture system calibration data, to a virtual viewpoint, according to one embodiment.

FIG. 12A is an exemplary projection 1200 of the color image shown in FIG. 11A, using the depth map shown in FIG. 11B and the capture system calibration data, to a virtual viewpoint, according to one embodiment. Notably, there are clearly visible errors in the projection of the head a shoulders area. Accordingly, FIG. 12A may be an exemplary image_RENDER, and may be the result of rendering the subview from camera_OTHER, based on the transform REFERENCE_from_OTHER and the estimated world properties (in this case, the depth map).

Figure 12B:
FIG. 12B shows an exemplary subview from a camera in an array light-field capture system, according to one embodiment.

FIG. 12B shows an exemplary subview 1250 from a camera in an array light-field capture system, according to one embodiment. The location of this subview may be nearly identical with the virtual viewpoint used to compute FIG. 12A. Accordingly, FIG. 12B may contain the subview from camera_REFERENCE, and may be an example of image_GROUNDTRUTH. Notably, if image_RENDER and image_GROUNDTRUTH are compared, some areas may match very well, while some areas may match very poorly.

Figure 13:
FIG. 13 shows an exemplary confidence map, projected identically to the image in FIG. 11A, according to one embodiment.

FIG. 13 shows an exemplary confidence map 1300, projected identically to the image in FIG. 11A, according to one embodiment. Accordingly, FIG. 13 may contain the confidence map generated by comparing image_RENDER to image_GROUNDTRUTH. White areas represent high confidence values, while dark areas represent low confidence values.

Notably, the examples provided above use only two cameras for clarity. In practice, every camera may be compared against a plurality of other cameras. The final confidence and/or quality scores may be computed as any function of all the inputs (for example, the minimum, mean, or median values may be used).

Virtual View Generation

Pursuant to the step 160, virtual views may be generated (i.e., "reconstructed") in various ways. In at least one embodiment, virtual camera images may be generated using depth image based rendering (DIBR). In this approach, virtual views may be reconstructed at any virtual camera position and/or orientation within the light-field volume. Color image data from the subviews may be warped and/or projected into the virtual camera view using the estimated world properties (for example, including depth), and the capture system calibration data.

In at least one embodiment, where a tiered camera array is used, generation of the virtual view may proceed with reference to the confidence value for each ray bundle. For example, for each ray bundle in the high quality camera set (i.e., a pixel value from a single capture camera), if the confidence value is high (i.e., estimated world properties associated with that ray are of high quality and/or confidence), then the system may use the ray bundle with a high influence value. Conversely, if the confidence value is low, either the ray is not used, or it is assigned a low influence value. For example, ray influence may be assigned in the following manner to the high quality camera set:

```
if (confidence > High_C)
    influence = 1
else if (confidence > Low_C)
    influence = (confidence-Low_C)/(High_C-Low_C)
else
    influence = 0
```

In one embodiment, High_C may be equal to 0.5 and Low_C may be equal to 0.3. Of course, this assignment of influence is exemplary, and many other assignment functions may be used.

In at least one embodiment, depth image based rendering may be performed using the data corresponding to the Tier 1 cameras. The reconstruction may be performed according to any existing methods, and may further include the influence channel in the reconstructed image. In one embodiment, the output may be a four-channel image with red, green, blue, and influence. Further, depth image based rendering may be separately performed on the other tiers of cameras.

The reconstructed images may then be combined by treating the influence channel as a typical alpha channel, and successively performing the SRC_OVER operation, where the lowest tier camera data may be considered the source. After combination, if any pixels remain with influence values below 1, the system may fill those pixels with data from the highest tier reconstructed image (lowest resolution), using any existing hallucination or fill algorithm, or any other approach.

For example, as mentioned previously, FIG. 12A is an exemplary projection 1200 of the color image shown in FIG. 11A, using the depth map shown in FIG. 11B and the capture system calibration data, to a virtual viewpoint. Notably, there are clearly visible errors in the projection of the head a shoulders area. FIG. 13 shows an exemplary confidence map 1300, projected identically to the exemplary projection 1200 in FIG. 12A. For the purposes of this example, FIG. 13 may also represent the influence map where the influence of a region of a subview is directly proportional to the confidence level in the associated world properties. In some embodiments, this may not be the case, as influence may have a nonlinear relationship with confidence; thus, the influence map may be based on the confidence map, but may not have the same appearance.

Figure 14B:
FIG. 14B shows the projected image from another subview, according to one embodiment.
Figure 14A:
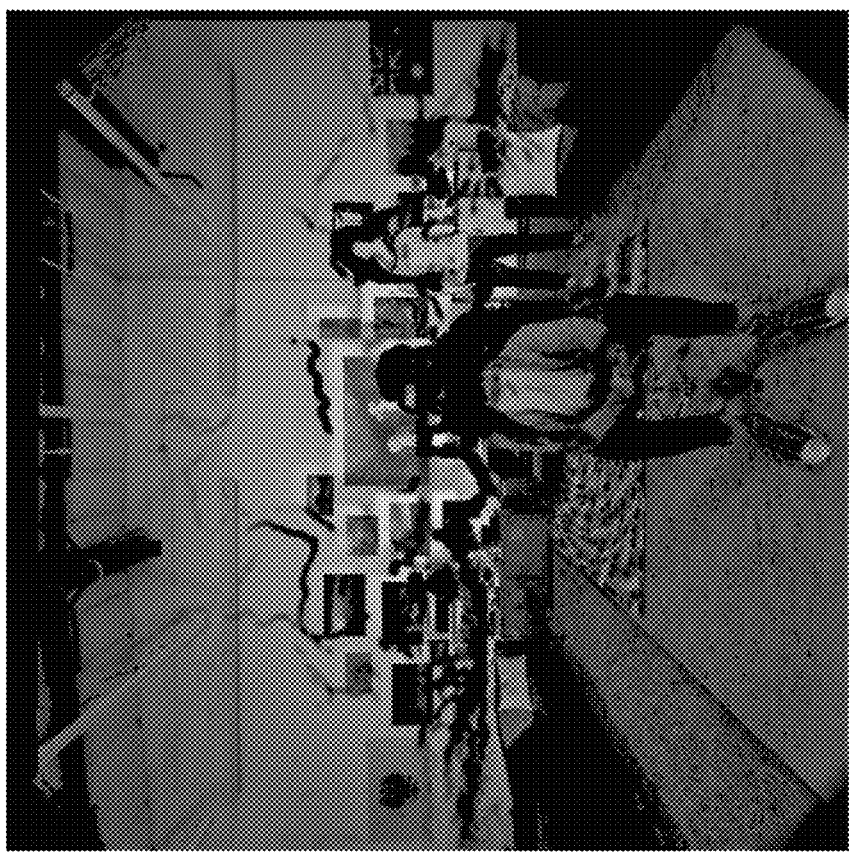
FIG. 14A shows the projected image from 12A, using the confidence data from 13 to assign a per-pixel influence value to use in image reconstruction, according to one embodiment.

FIG. 14A shows the projected image 1400 from FIG. 12A, using the confidence data from FIG. 13 to assign a per-pixel influence value to use in image reconstruction, according to one embodiment. For exemplary purposes, the color values have been pre-multiplied by the influence values to illustrate which data may be used and which may be ignored as part of image reconstruction.

FIG. 14B shows the projected image 1450 from another subview, according to one embodiment. This subview may be a camera from a tier consisting of relatively lower resolution and higher density (for example, a Tier 2 or Tier 3 camera in the exemplary camera systems of FIGS. 7 and 8). The projection, compared to FIG. 12A, is of significantly lower resolution, but also contains significantly less projection error.

Figure 15:
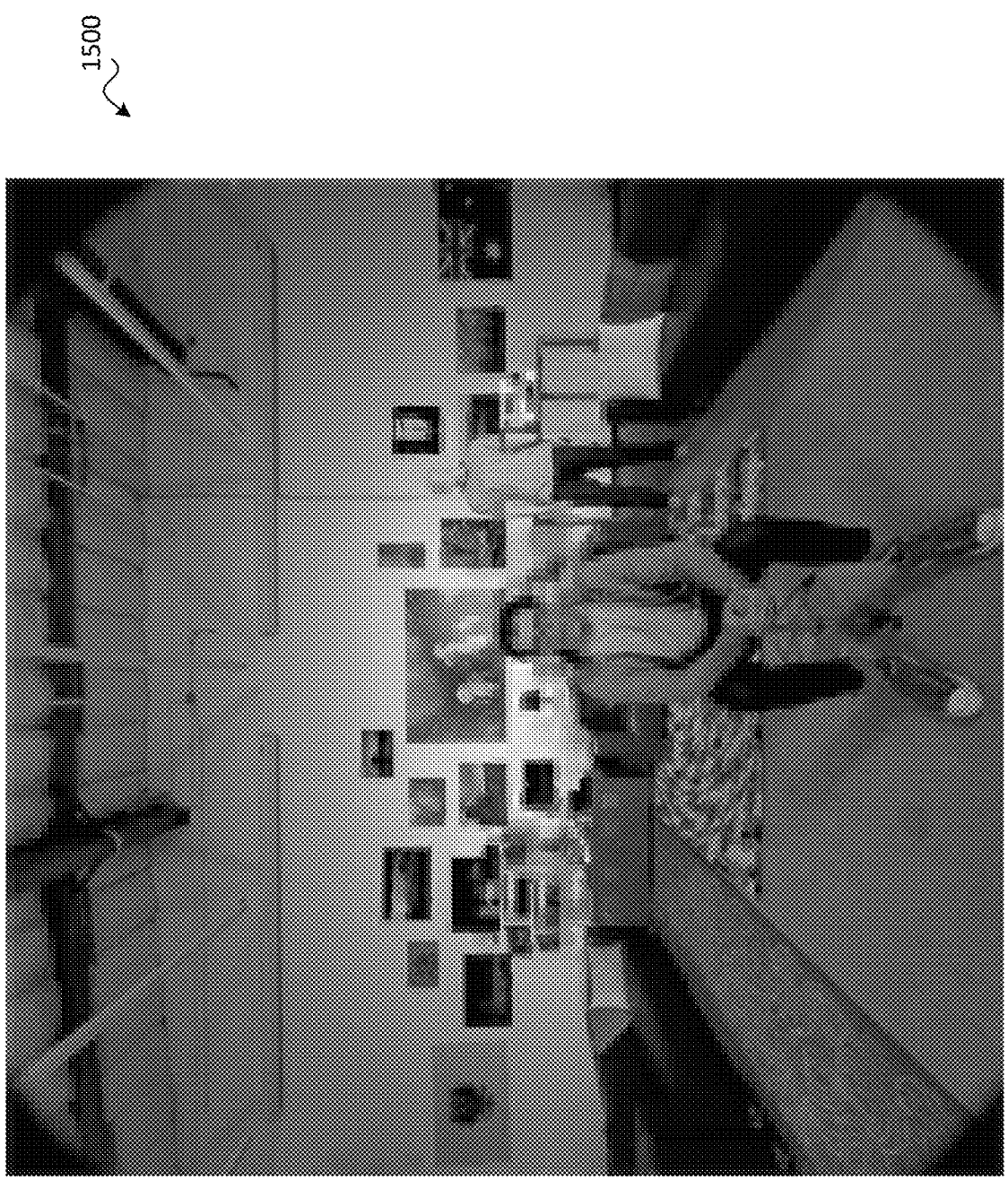
FIG. 15 shows a merged projected image, based on the color data shown in FIGS. 14A and 14B, according to one embodiment.

FIG. 15 shows a merged projected image 1500, based on the color data shown in FIGS. 14A and 14B, according to one embodiment. The color data from FIG. 14A has been preferentially selected, using color data from FIG. 14B to fill in regions of that are missing information and/or have information with low confidence (due to low confidence and/or occlusion). The color data shown in FIGS. 14A and 14B may be combined using the SRC_OVER operation, where FIG. 14A is the SRC image, FIG. 13 represents the source alpha channel, and FIG. 12B is the DST image. Notably, while this example uses only two subviews from two tiers for clarity, the approach may be used on an arbitrary number of subviews from an arbitrary number of tiers.

In at least one embodiment, during reconstruction, the system uses rays requiring the least interpolation (which will generally be from lower quality but more densely packed cameras) to fill in areas of the virtual view with low confidence/high error in the estimated world properties. In at least one embodiment, a tiered approach may be used, in which more than two types of camera are used. Using such an approach, high confidence is associated with highest resolution, midconfidence is associated with mid-level resolution, and low or no confidence is associated with low resolution. Additional tiers may also be provided, if appropriate.

In at least one embodiment, the system blends regions of low confidence with those of high confidence, so as not to introduce undesirable artifacts. For example, small amounts of local filtering and/or blending can be used in the final rendering of images. As a specific example, a five-pixel blending zone may be used to smooth the change from one resolution level to another.

Using the above-described techniques, most areas of the scene may be fully reconstructed from the high resolution data with excellent results. Difficult areas, like specular reflections, transparent objects, and textureless surfaces, may be reconstructed generally using the lower resolution data. While the captured resolution is lower, the overall quality in those regions may be significantly higher because minimal (incorrect) interpolation is performed.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CDROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A tiled camera array, comprising:
a framework comprising an imaging surface;
a first plurality of cameras arranged, with a first density, in a first tiled array on the imaging surface, wherein each camera of the first plurality of cameras comprises a first resolution; and
a second plurality of cameras arranged, with a second density, in a second tiled array on the imaging surface, wherein each camera of the second plurality of cameras comprises a second resolution;
wherein:
the first tiled array is interspersed among the second tiled array;
the first resolution is greater than the second resolution;
the second density is greater than the first density; and
the first plurality of cameras and the second plurality of cameras cooperate with each other to capture a light-field volume within an environment, wherein a plurality of subviews are captured by each camera in the first and second plurality of cameras and a confidence map of a tertiary subview of the plurality of subviews is used to generate a virtual view by selecting, for inclusion in the virtual view, one or more regions of the tertiary subview having a higher confidence in the confidence map than corresponding regions of a second confidence map.

2. The tiled camera array of claim 1, further comprising a processor configured to use the light-field volume to generate a virtual view depicting the environment from a virtual viewpoint.

3. The tiled camera array of claim 1, wherein the first tiled array comprises a first hexagonal lattice.

4. The tiled camera array of claim 3, wherein the second tiled array comprises a second hexagonal lattice that is denser than the first hexagonal lattice, the second tiled array defining a first plurality of spaced-apart voids that accommodate the first hexagonal lattice.

5. The tiled camera array of claim 4, further comprising a third plurality of cameras arranged, with a third density, in a third tiled array on the imaging surface, wherein each camera of the third plurality of cameras comprises a third resolution.

6. The tiled camera array of claim 5, wherein:
the first and second tiled arrays are interspersed among the third tiled array;
the second resolution is greater than the third resolution;
the third density is greater than the second density; and
the third plurality of cameras is configured to cooperate with the first plurality of cameras and the second plurality of cameras to capture the light-field volume.

7. The tiled camera array of claim 6, wherein the third tiled array comprises a third hexagonal lattice that is denser than the second hexagonal lattice, the third tiled array defining a second plurality of spaced-apart voids that accommodate the second hexagonal lattice.

8. The tiled camera array of claim 1, wherein the imaging surface comprises a hexagonal shape.

9. A method, comprising:
arranging a first plurality of cameras of a tiled camera array with a first density in a first tiled array on an imaging surface of a framework, wherein each camera of the first plurality of cameras comprises a first resolution; and
arranging a second plurality of cameras the tiled camera array with a second density, in a second tiled array on the imaging surface, wherein each camera of the second plurality of cameras comprises a second resolution; and
interspersing the first tiled array among the second tiled array, wherein:
the first resolution is greater than the second resolution;
the second density is greater than the first density; and
the first plurality of cameras and the second plurality of cameras cooperate with each other to capture a light-field volume within an environment, wherein a plurality of subviews are captured by each camera in the first and second plurality of cameras and a confidence map of a tertiary subview of the plurality of subviews is used to generate a virtual view by selecting, for inclusion in the virtual view, one or more regions of the tertiary subview having a higher confidence in the confidence map than corresponding regions of a second confidence map.

10. The method of claim 9, further comprising:
configuring a processor of the tiled camera array to use the light-field volume to generate a virtual view depicting the environment from a virtual viewpoint.

11. The method of claim 9, wherein the first tiled array comprises a first hexagonal lattice.

12. The method of claim 11, wherein the second tiled array comprises a second hexagonal lattice that is denser than the first hexagonal lattice, the second tiled array defining a first plurality of spaced-apart voids that accommodate the first hexagonal lattice.

13. The method of claim 12, wherein the tiled camera array further comprises a third plurality of cameras arranged, with a third density, in a third tiled array on the imaging surface, wherein each camera of the third plurality of cameras comprises a third resolution.

14. The method of claim 13, further comprising:
interspersing the first and second tiled arrays among the third tiled array, wherein:
the second resolution is greater than the third resolution;
the third density is greater than the second density; and
the third plurality of cameras is configured to cooperate with the first plurality of cameras and the second plurality of cameras to capture the light-field volume.

15. The method of claim 14, wherein the third tiled array comprises a third hexagonal lattice that is denser than the second hexagonal lattice, the third tiled array defining a second plurality of spaced-apart voids that accommodate the second hexagonal lattice.

16. The method of claim 15, wherein the imaging surface comprises a hexagonal shape.

\* \* \* \* \*